Nov. 28, 1939.    W. C. LEINGANG ET AL    2,181,303
BATTERY TESTING APPARATUS
Filed Nov. 6, 1935
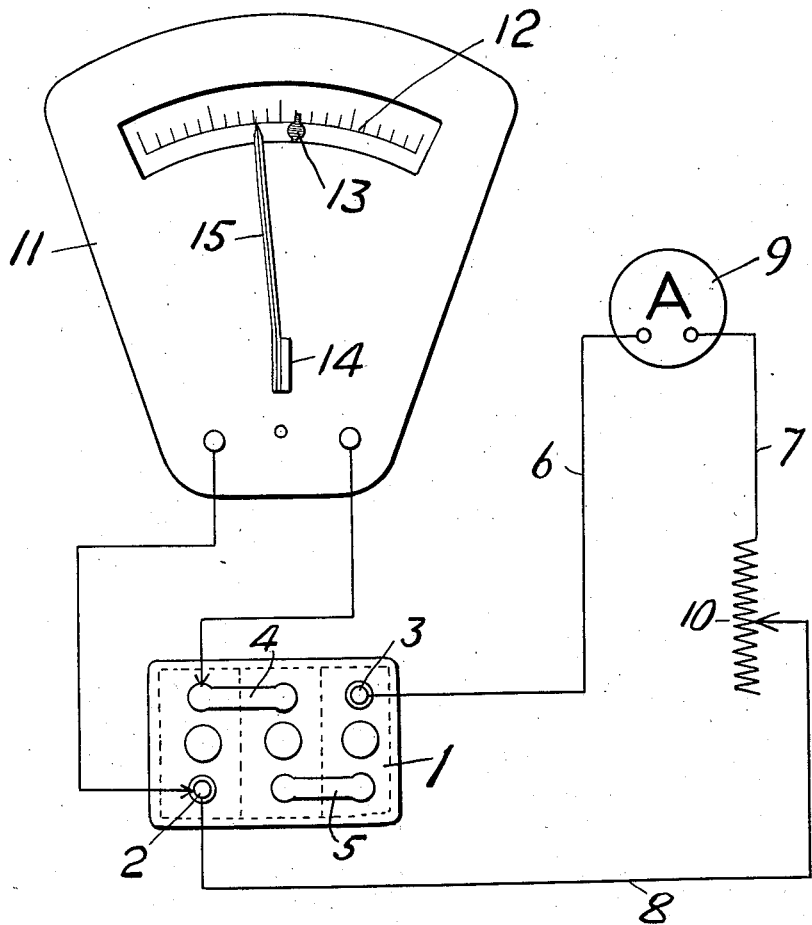
WITNESS:
INVENTORS
William C. Leingang
and Rufus C. Rudisill
BY
Augustine G. Stoughton
ATTORNEY.

Patented Nov. 28, 1939

2,181,303

UNITED STATES PATENT OFFICE 2,181,303

BATTERY TESTING APPARATUS

William C. Leingang, Philadelphia, and Rufus C. Rudisill, Glenside, Pa., assignors to The Electric Storage Battery Company, Philadelphia, Pa., a corporation of New Jersey Application November 6, 1935, Serial No. 48,500

3 Claims. (Cl. 171—95)

One of the tests to which a battery, which has been in service on an automobile, is subjected in order to determine its condition is to take a discharge current from the battery, the value of this current being adjusted to give a predetermined voltage across the terminals of each of the cells. If the current thus taken from the battery when the voltage registers the predetermined value is below a certain minimum, that is, if the battery cannot give a certain discharge current without its voltage dropping below the predetermined value, the cell is considered to be in unsatisfactory condition for further service.

It is a recognized fact, however, that at low temperatures the cell voltage under a given rate of discharge will be lower than at normal temperatures. It is therefore necessary in carrying out the test above described to adopt a lower predetermined voltage when the temperature is lower than that used at normal temperatures. The improvement involved in the present invention consists in providing, in connection with the voltmeter used for making the test, automatic means for adjusting the predetermined voltage in response to changes of temperature so that the apparatus will give substantially the same indication as to the battery condition at low temperatures as at normal temperatures.

The single figure of the accompanying drawing represents diagrammatically an arrangement of testing apparatus embodying features of the invention.

In the drawing, I represents the top view of an ordinary automobile three-cell starting and lighting battery, of which 2 and 3 are, respectively, the positive and negative terminals of the battery and 4 and 5 the intercell connectors between adjacent cells. For the purpose of making the test referred to above, a discharge circuit is established via conductors 6, 7 and 8 between the battery terminals 2 and 3, this discharge circuit including an ammeter 9 and an adjustable rheostat 10. Connected across the terminals of one of the cells, that is, between terminal 2 and inter-cell connector 4, is shown a voltmeter 11 provided with a scale 12 and a moving indicator-hand 13 adapted to indicate the voltage of the cell being tested. Mounted on the voltmeter by means of a fixed support 14 is a pointer 15 designed to indicate on the voltmeter scale the predetermined voltage employed in testing the battery. This pointer 15 consists of a bimetallic strip responsive to changes of temperature and so designed that the point on the voltmeter scale indicated by its free end will vary with the temperature to correspond with the variation in voltage at the cell terminals under different temperature conditions under the same discharge rate.

In carrying out the test with this apparatus, the discharge current taken from the battery will be adjusted by means of the adjustable rheostat 10 until the moving indicator-hand of the voltmeter 13 comes opposite the free end of the pointer 15. The reading of the ammeter 9 will then be observed and compared with the current which should be obtained from a similar battery in good operating condition. If the pointer 15 is properly designed in accordance with well-known principles to correspond with the variations in battery voltage with change of temperature under a given discharge rate, the results obtained by this apparatus as indicating the condition of the battery will be independent of the temperature.

It will, of course, be understood that the test should be made when the temperature of the battery is susbtantially the same as the temperature which affects the pointer 15.

We do not intend to be limited save as the scope of the prior art and of the attached claims may require.

We claim:

1. In apparatus for testing storage batteries having means for adjusting the discharge current from the battery, a volt meter having a pointer adapted to be positioned in response to the ambient temperature to which the battery is exposed, a stationary scale and a movable hand, said hand and pointer being arranged in parallel planes and said hand being adapted to come opposite the free end of the pointer for visual indication as the discharge current from the battery is adjusted.

2. In apparatus for testing storage batteries having means for adjusting the discharge current from the battery, a volt meter having a pointer adapted to be positioned in response to the ambient temperature to which the battery is exposed, a stationary scale and a movable hand, said hand and pointer being arranged in parallel planes and on opposite sides of the face of the instrument and said hand being adapted to come opposite the free end of the pointer for visual indication as the discharge current from the battery is adjusted.

3. In apparatus for testing storage batteries having means for taking a predetermined discharge current from the battery, a voltmeter having a pointer adapted to be positioned in response to the ambient temperature to which the battery is exposed, a stationary scale, and a movable hand, said hand and pointer being arranged in parallel planes and said hand being arranged to come opposite the free end of the pointer for visual indication in response to battery voltage during discharge.

WILLIAM C. LEINGANG.
RUFUS C. RUDISILL.